United States Patent [19]

Schiesser

[11] 4,116,096

[45] Sep. 26, 1978

[54] STRIP CUTTER APPARATUS FOR ROLLED SHEET FORMED OF RUBBER

[75] Inventor: Walter Hugo Schiesser, Zürich, Switzerland

[73] Assignee: Schiesser AG, Zürich, Switzerland

[21] Appl. No.: 746,548

[22] Filed: Dec. 1, 1976

[30] Foreign Application Priority Data

Dec. 5, 1975 [CH] Switzerland ........................ 15865/75

[51] Int. Cl.[2] .......................... B23D 19/00; B26D 1/22

[52] U.S. Cl. ........................................ 83/101; 83/113; 83/506

[58] Field of Search ................. 83/101, 113, 118, 168, 83/505, 506, 116, 117

[56] References Cited

U.S. PATENT DOCUMENTS

| | | | |
|---|---|---|---|
| 417,093 | 12/1889 | Robinson | 83/101 |
| 642,220 | 1/1900 | Green | 83/101 X |
| 705,040 | 7/1902 | Copland | 83/101 X |
| 1,130,909 | 3/1915 | Kremer | 83/506 X |
| 1,302,414 | 4/1919 | Nerness | 83/101 X |
| 2,311,692 | 2/1943 | Potderin | 83/101 |
| 2,706,000 | 4/1955 | Landis | 83/506 X |

*Primary Examiner*—J. M. Meister

*Attorney, Agent, or Firm*—Ostrolenk, Faber, Gerb & Soffen

[57] ABSTRACT

A strip cutter apparatus for rolled sheet formed of rubber and elastomeric materials, comprising a transport device for the rolled sheet and a plurality of disc-shaped cutters arranged transversely with respect to the transport direction of the material. The cutters cut the rolled sheet into individual strips. A revolving brush is driven in the direction of transport and is provided after the cutters, viewed in the direction of travel of the rolled sheet. This revolving brush is arranged in such a manner that its bristles penetrate into the intermediate spaces between the cutters and displace away from the sides of the cutters any material which possibly has been raised by the cutters.

6 Claims, 2 Drawing Figures

STRIP CUTTER APPARATUS FOR ROLLED SHEET FORMED OF RUBBER

BACKGROUND OF THE INVENTION

The present invention relates to strip cutter apparatus for rolled sheet formed of rubber and rubber-like or elastomeric material.

In the rubber industry the so-called rolled sheet or hide is a basic product in the manufacturing process. The rolled sheets — as the name suggests — are produced by rolling a rubber mixture consisting of raw rubber, fillers and different chemicals. The agglomerates composed of the raw mixture, delivered from the internal mixer to the rolling mill, are worked into a finer state by revolving upon the front roll of this double roll-rolling mill. Such mixture is then removed from this roll as a sheet in heated condition at a temperature between 90° C. and 140° C. and having an average thickness of 8 to 10 mm and an average width of 600 to 800 mm (in larger manufacturing installations, such as tire production plants, up to 1400 mm width) and conducted by means of a conveyor belt into the cooling machine, the so-called batch-off-installation. In the batch-off-installation this sheet or hide is quenched with cooling water at the starting region in the so-called spray chamber and upon passing through the tunnel the residual cooling and drying is accomplished by ventilators. At the end of this manufacturing process the sheet is either cut into plates or deposited upon pallets or the like in a zig-zag configuration and delivered, for instance, in stacks between 50 and 1000 kg to the mixture storage. There is added a parting compound or release agent to the spray water, in order to prevent bonding of the sheet during stacking upon the pallet.

These rolled sheets serve as the starting product for all further manufacturing operations in the rubber factory, whether such be, for instance, the production of tires, the fabrication of profiled sections, hoses, molded parts, shoe soles or other rubber products.

However, the rolled sheets cannot be used for production in the form in which such arrive as an intermediate product from the mixer, typically in the form of rolled sheets of 8 to 10 mm thickness and usually 600 to 800 mm width and in lengths up to 50 meters. The rolled sheets thus must be cut into so-called blanks, and for the most part the sheets are cut into strips between 40 and 120 mm width. By means of these cut strips it is now possible to directly charge the extruder of injection molding machines or extruders for producing profiled sections, hoses, plates and so forth.

Oftentimes, these strips are cut from the cold rolled sheets during a separate working step with the aid of so-called strip cutting machines. Owing to the toughness of the rolled sheet in its cold condition there is required the application of considerable forces and, furthermore, the danger exists that the strips cut from the rolled sheets will again stick together in an uncontrolled manner at the cut locations, because at these locations the rolled sheet is not covered with any release agent or parting compound. Hence, it is oftentimes necessary to apply powder to the cut strips, resulting in contamination of both the raw mixture as well as the room in which the work is carried out.

Another heretofore known possibility of manufacturing strips from rolled sheets resides in delivering such once more to the rolling mill and then withdrawing from the rolling mill, or for instance by means of a three roll-calender, strips of the desired width in a heated condition. The cooling of the individual strips is accomplished in a water basin (throughpass basin or spray basin). Also in this case the water is imbued with a release agent. All of these operations are time-consuming additional operations, which also require an appropriate amount of space, need an additional energy supply and also can impair the quality of the unvulcanized rubber mixture.

SUMMARY OF THE INVENTION

It is therefore a general object of the present invention to provide a new and improved construction of an apparatus for cutting strips from rolled sheets formed of rubber or rubber-like materials in a manner not associated with the aforementioned drawbacks and limitations of the prior art proposals.

Another and more specific object of the present invention aims at the provision of a new and improved construction of a strip cutter apparatus for rolled sheet or the like, composed of a transport device for the rolled sheet and a number of substantially disc-shaped cutter knives or cutters arranged adjacent one another transverse to the transport direction of the rolled sheet for cutting such rolled sheet into individual strips.

Now in order to implement these and still further objects of the invention, which will become more readily apparent as the description proceeds, the apparatus of this development is manifested by the features that a revolving brush having bristles, driven in the transport direction of the rolled sheet, is provided after the cutters, viewed in the direction of throughpassage of the rolled sheet, and this brush is arranged in such a manner that the bristles thereof engage into the intermediate spaces between the cutters and push away from the sides of the cutters material which possibly has been raised by the cutters.

The revolving brush is advantageously driven at a greater speed than the transport device which is constructed as a conveyor belt.

It is particularly advantageous to mount the strip cutter apparatus in the cooling installation i.e. batch-off-installation.

By means of a strip cutter apparatus mounted at the infeed band of the cooling installation (batch-off-installation) there are eliminated all of the heretofore known drawbacks, to wit:

(a) Without any subsequent additional operations there is available at the end of the cooling installation strips of desired width, instead of only rolled sheets.
(b) No additional handling is needed
(c) There is no need for additional personnel.
(d) There is no need for the use of additional machines.
(e) There is no requirement for additional energy, since the cutters for the throughpassing rolled sheet, which cutters are advantageously mounted to be freely rotatable, are entrainably driven by the drive of the infeed band or a counter pressure roll.
(f) There is no contamination of the mix.
(g) There is no change in the quality of the mix.
(h) There is no sticking together or bonding of the cut strips, which otherwise would have an adverse disturbing effect upon the further manufacturing operations and retard the output.

The advantages of cutting rolled sheets in a heated condition, as such is possible with the apparatus of the present invention, have been known for quite some time. For instance, the cutting of strips by means of a large number of circular cutters or knives directly at the roll of the rolling mill is known in the art. However, difficulties were found to exist, forcing those attempting to work with this principle to forego using the same, Specifically, the difficulties which were found were:

(a) The rolled sheets cannot be cut into strips already from the start, rather there must remain a closed sheet over a length of one to two meters for the removal from the roll of the rolling mill, since the operator at the rolling mill, while being able to remove a wide sheet of 600 to 800 mm, is unable to collectively remove a great number of individual strips, since such adhere to the roll of the rolling mill and at the start must be somewhat torn off. This non-cut portion at the start of the sheet must then be subsequently manually cut-through with a cutter or knife.

(b) On the other hand, it can happen that a hole is formed in the rolled sheet and thus a number of strips are torn off. Now it is necessary for the operator to either interrupt the operation at the rolling mill and start anew, or, however, they must individually tear away the strips which again are revolving at the roll and also individually deposit such upon the infeed band of the cooling installation. This is associated with hazards for the operator and can also lead to further tear locations, so that the chain of torn sheets does not tear off and during further processing corresponding difficulties arise. Hence, there was practically a complete departure from this strip fabrication technique, and it was necessary to content oneself with the removal of an individual narrow strip from the rolling mill, even with the danger of a reduction in quality.

Also the possibility of cutting cold rolled sheets at the end of the cooling installation has again been dropped, because if this technique is utilized there is required the installation of an additional unit having separate energy requirements. This also requires the additional application of powder in order to prevent any sticking together at the cut locations. However, it is not possible to again spray the product with a parting agent dissolved in water, because at this stage of processing further drying is no longer possible.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figures 1, 2:
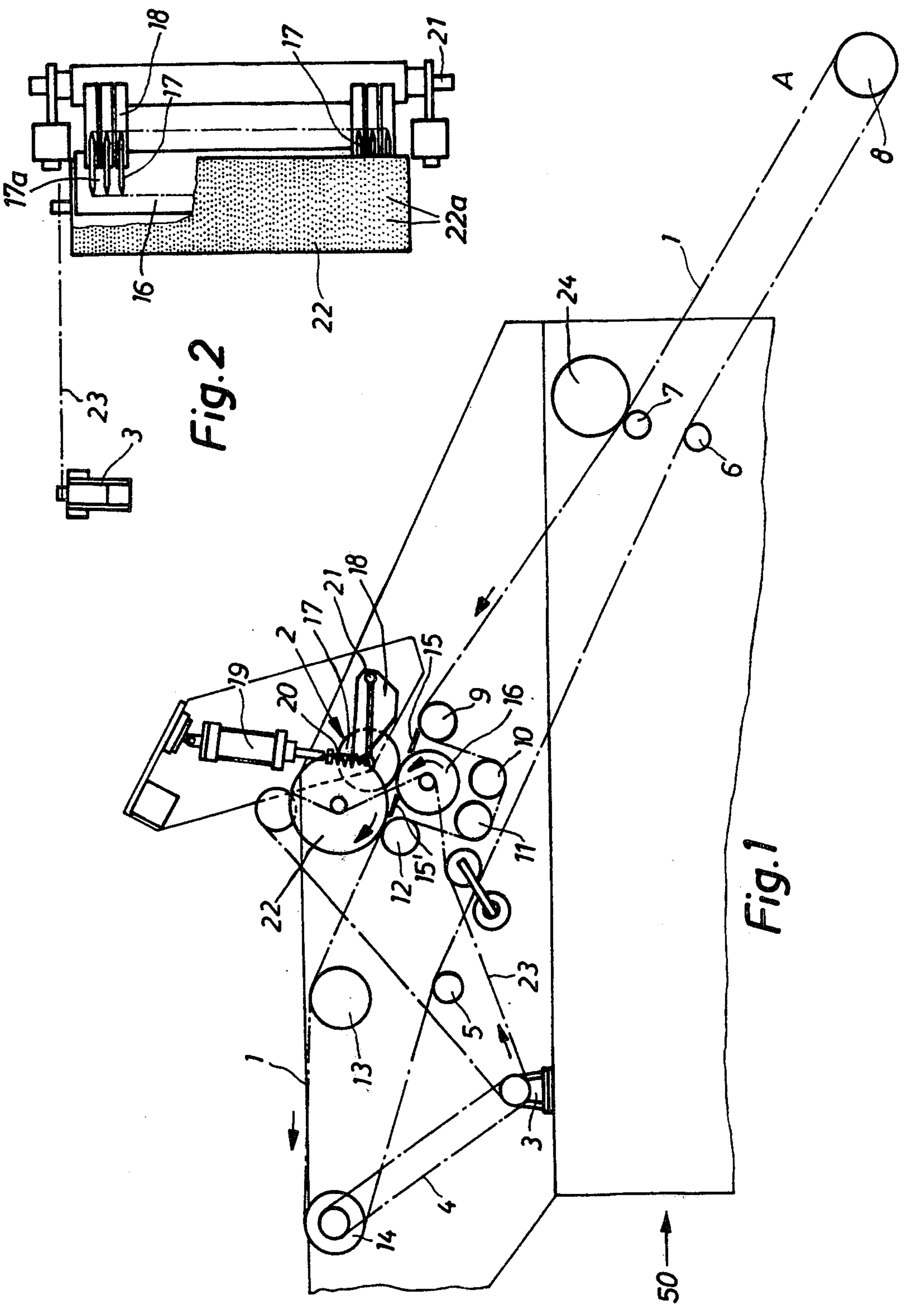
FIG. 1 is a side schematic view of a strip cutter apparatus for rolled sheet, as the same can be arranged for instance in a batch-off-installation.
FIG. 2 is a top plan view of part of the apparatus of FIG. 1.

Describing now the drawings, FIG. 1 illustrates an exemplary embodiment of strip cutter apparatus designed according to the teachings of the present invention. A conveyor belt or band 1 is provided for transporting rolled sheet delivered by a not particularly illustrated rolling mill, at location A, through the actual strip cutter apparatus 2. The conveyor belt 1 is driven by a suitable drive motor 3 by means of a chain 4 or equivalent structure. The conveyor belt or band 1 is guided upon the support rollers or rolls 5, 6, 7 and the deflecting rolls or rollers 8, 9, 10, 11, 12, 13 and 14.

Arranged at the cutting station, constituted by the strip cutter apparatus 2, is a table 15, 15' and a counterpressure roll 16. Substantially disc-shaped or circular cutters or knives 17 are arranged transversely across the width of the transport path defined by the conveyor belt 1 above the aforementioned counterpressure roll 16. The cutters 17 are individually mounted to be freely rotatable in the rocker arms or balances 18 and can be collectively shifted downwardly towards the counterpressure roll 16 into their work position by means of a suitable work cylinder 19, for instance a pneumatic cylinder arrangement. Each cutter 17 can however escape upwardly against the force of a spring 20. The cutters 17 and the rocker arms or balances 18 are mounted upon a shaft 21. Their mutual position (spacing from one another) can be randomly adjusted, in order to thereby set a desired strip width. Thus, it would be possible to place standard spacers between the cutters to vary the mutual spacing or to use any other appropriate structure accomplishing this result.

Arranged above the conveyor belt 1, after the cutters 17, when viewed in the direction of travel of the rolled sheet, is a revolving brush 22 having the bristles **22*a* and constituting one of the most significant aspects of the invention. The bristles 22*a* of the brush 22 penetrate into the intermediate spaces 17*a* between the cutters 17. As a result, there is achieved the effect which has been described above and which will be explained again more fully hereinafter, i.e. the individual bristles penetrating into the intermediate spaces or gaps 17*a* between the cutters 17 press the dammed-up material of the rolled sheet immediately away from the side surfaces of the cutters, so that such remain seated upon the conveyor belt 1 defining the transport path. It is advantageous to arrange the bristle brush 22 above the conveyor belt 1 in such a manner that the free or outer ends of the bristles 22*a* engage into the intermediate spaces 17*a* of the cutters 17 up to approximately the center of the associated cutter and, further, up to approximately the plane of the conveyor belt or band 1**.

The counterpressure roll 16 and the brush 22 are likewise driven by the drive motor 3 for the conveyor belt 1 by means of a chain 23. The peripheral speed of the roller brush or brush 22 is considerably greater than the speed of travel of the conveyor belt 1.

With the previously described strip cutter apparatus, installed at the infeed band of the cooling installation or batch-off-installation, generally indicated by reference character 50, the wide rolled sheet travels to a feeler roll 24, which upon being raised by the incoming material, delivers a command signal for the pneumatic cylinder arrangement 19, whereby the shaft 21 with the circular cutters 17 is lowered, these cutters 17 pressed towards the counterpressure roll 16 and there immediately begins the cutting of the rolled sheet upon its entry at the cutting zone. In order to ensure for a uniform contact of each individual cutter 17 (especially when working with wide sheets) and to compensate for certain irregularities during the subsequent grinding of the cutters or wear or irregular wear of the counterpressure roll, each cutter 17 is separately suspended, in other words separately mounted and provided with the aforementioned compression or pressure springs 20.

The counterpressure roll 16 and the roller brush 22 are driven, so that there cannot be formed any build-up or dam-up of the rolled sheet when it reaches the area of the cutter apparatus.

Due to the penetration of the cutters 17 into the rubber there is present at both sides of each cutter a large contact surface with the tacky rubber, which in the absence of the inventive apparatus would result in individual strips, or in the case of very soft mixtures, the entire sheet width being lifted-up together with the cutters and wound about the cutter bearings or supports. The operator of the rolling mill, which at the same time also attends to the batch-off-installation, thus would be forced to stop the batch-off-installation, to untangle the entanglement of the material at the cutters and to return the mixture back to the rolling mill. As a result, an interruption in the production time of 10 to 20 minutes can result, and this can produce extremely catastrophic effects, specifically the following:

(a) Due to the long residence time without any quench cooling with spray water the mixture can prevulcanize. It then must be thrown away, which under circumstances with even only a single mixture or batch can result in appreciable financial losses.

(b) If there are employed cycle times of 3 minutes per mixture, then with, for instance, 12 minutes of interruption, there is missing from the production four mixtures or batches, i.e. possibly one ton of material or more.

(c) Consequently it can happen that, for instance, in an extruder department one or a number of extruders no longer can be placed into operation for a number of hours so that 10 or 20 workers are forced to remain idle during this time.

(d) Now since these profiled sections are not available the vulcanization department during such time is not able to proceed with its work, and if these profile sections were intended for being built-up into tires, then also the workers in the tire build-up department would not be able to continue with their work.

(e) It will be recognized that a small defect has a large effect upon the production of the plant. From 12 minutes of interruption, as noted above, there can be lost, under circumstances, several hundred working hours for the plant.

In order to prevent these defects which arise due to the bonding at the sides of the cutters, as above explained, attempts have been made to downwardly displace the upwardly traveling sheet by means of guide brackets between the cutters. Since this did not provide any success, attempts were made to arrange at such locations driven rolls between the cutters. However, since such rolls possess a certain surface, the rubber likewise bonded at such surfaces and the result was even worse. With very narrow rolls of only two to three millimeters the soft rubber adhesively bonded at the sides of such rolls and there could not be realized any beneficial effect at all. Also spraying of the cutters with water did not produce any positive results since the water, in the case of sheets of 8 mm thickness, was not able to penetrate into the cut gaps, in order to prevent sticking to the sides of the cutters. The same unsatisfactory effect was noticed when a powder roller was arranged in front of the cutters.

Owing to the roller brush 22 employed with the inventive apparatus, and which is likewise driven and arranged after the cutters or knives 17, the problem could be solved inasmuch as the individual bristles 22*a* of the brush penetrate into the intermediate spaces 17*a* between the cutters and press the dammed-up material immediately away from the sides of the cutters 17. There was found a 100 percent positive effect. Since the brush bristles 17*a* only have small surfaces, a sticking of the material at such bristles cannot occur and the resilient or spring action of the individual bristles additionally contributes to the ability of the strips to slightly raise, but immediately again traveling further without being able to wind about the cutters.

At the cutters, of for instance 150 to 200 mm diameter, there are advantageously additionally provided one to two small notches, so that the individual strips at the cut locations are interconnected at the lower portion, however only at a height of about one-half to one millimeter with one another by webs. As a result, there is realized an additional holding together of the strips and also the automatic stacking at the end of the conveyor belt in a zig-zag configuration upon a pallet or the like is not endangered (individual strips cannot drop away), without such having an influence upon the further operation, since the webs are torn through immediately and without any disadvantage during lateral removal of the individual strips.

Finally, it is to be remarked that during cutting into strips, prior to passage into the spray chamber or compartment (not shown) the cooling water containing the release agent not only coats both surfaces of the strips, but also the cut or cutting surfaces. Hence, there is no longer possible renewed sticking together of such cut surfaces.

While there are shown and described present preferred embodiments of the invention, it is to be distinctly understood that the invention is not limited thereto, but may be otherwise variously embodied and practiced within the scope of the following claims. Accordingly,

What is claimed is:

1. A strip cutter apparatus for rolled sheet formed of rubber and rubber-like material, comprising:

a transport device for transporting the rolled sheet in a predetermined direction of travel; said transport device comprising a conveyor band for the rolled sheet;

a number of adjacently arranged substantially disc-shaped cutters located transversely with respect to the direction of travel of the rolled sheet for cutting the rolled sheet into individual strips;

a roller brush having bristles and arranged after the cutters, viewed in the direction of travel of the rolled sheet;

means for driving said roller brush in the direction of travel of the rolled sheet;

means mounting said cutters to provide intermediate spaces between neighboring said cutters;

said bristles of said roller brush penetrating into the intermediate spaces between said cutters for displacing away from the sides of said cutters material of the rolled sheet which possibly has been lifted by said cutters, and realigning said strips in flat condition on said conveyor band;

said roller brush being arranged above said conveyor band in such a manner that the outer ends of said bristles engage into the intermediate spaces of said cutters up to about the center of said cutters and up to about a plane containing said conveyor band.

2. The apparatus as defined in claim 1, wherein said transport device comprises:

a conveyor band for the rolled sheet; and means for driving the roller brush at a greater speed than the conveyor band.

3. The apparatus as defined in claim 1, wherein said means for mounting said cutters comprises a common shaft and a spring-loaded balance for each cutter carried by said common shaft; a counterpressure roll; means for collectively displacing said cutters towards said counterpressure roll; means for driving said counterpressure roll in the direction of travel of said rolled sheet; each cutter being mounted to be freely rotatable at an end of its associated balance.

4. The apparatus as defined in claim 1, wherein said strip cutter apparatus is arranged in a batch-off-installation.

5. The apparatus as defined in claim 1, wherein said means for mounting said cutters comprises a common shaft and a spring-loaded balance for each cutter carried by said common shaft;

a counterpressure roll;

means for collectively displacing said cutters towards said counterpressure roll;

means for driving said counterpressure roll in the direction of travel of said rolled sheet;

each cutter being mounted to be freely rotatable at an end of its associated balance.

6. A strip cutter apparatus for rolled sheet formed of rubber and rubber-like material, comprising:

a transport device for transporting the rolled sheet in a predetermined direction of travel;

a number of adjacently arranged mutually spaced cutters located transversely with respect to the direction of travel of the rolled sheet for cutting the rolled sheet into individual strips;

a roller brush having bristles and arranged downstream of the cutters, viewed in the direction of travel of the rolled sheet;

means for driving said roller brush;

said bristles of said roller brush penetrating into the intermediate spaces between said cutters for displacing away from the sides of the cutters material of the rolled sheet which possibly has been lifted by said cutters, and realigning said strips in flat condition on said conveyor bands; and said roller brush being arranged above said conveyor band in such a manner that the outer ends of said bristles engage into the intermediate spaces of said cutters up to about the center of said cutters and up to about a plane containing said conveyor band.

* * * * *